Aug. 17, 1971  A. B. LA CONTI  3,600,228

MULTIPLE ELECTROLYTE HIGH VOLTAGE CELL

Filed April 4, 1966

Inventor:
Anthony B. LaConti,
by Carl O. Thomas
His Attorney.

United States Patent Office 3,600,228
Patented Aug. 17, 1971

3,600,228
MULTIPLE ELECTROLYTE HIGH VOLTAGE CELL
Anthony Basil La Conti, Lynnfield, Mass., assignor to General Electric Company
Filed Apr. 4, 1966, Ser. No. 539,810
Int. Cl. H01m *27/26;* C01b *13/04*
U.S. Cl. 136—86                                                   5 Claims

ABSTRACT OF THE DISCLOSURE

The potential of a fuel cell is increased by placing an alkaline electrolyte adjacent the anode and an acid electrolyte adjacent the cathode. The alkaline and acid electrolytes are separated by a cation exchange membrane. Hydrogen and oxygen may be obtained by electrolysis at a lower impressed potential than with cells having an acid or alkaline electrolyte only. The hydrogen evolving electrode is placed in contact with the acid electrolyte and the oxygen evolving electrode contacts the alkaline electrolyte with the cation exchange membrane separating the electrolytes.

---

My invention relates to high voltage cells employing a combination of electrolytes.

In recent years a renewed interest has developed in fuel cells. Such cells typically consist of an anode and a cathode mounted in spaced relation having an electrolyte providing ionic continunity therebetween. Means are provided to deliver a fuel such as hydrogen, alcohol, hydrazine, etc., to the anode, and similar means are provided to deliver an oxidant such as oxygen, air, halogen, etc., to the cathode. Such cells have evoked interest since they are capable of electrochemically combining the fuel supplied to the anode and the oxidant supplied to the cathode to generate electrical energy. Such cells offer the promise of avoiding the high energy losses inserent in the presently commercial thermodynamic processes of electrical energy generation. It is also recognized that the cells may be supplied with electricity and used to liberate electrolysis products at both the anode and the cathode.

One limitation of fuel cells developed thus far is the low voltage characteristics. A typical hydrogen-oxygen fuel cell develops only slightly more than one volt at open circuit potential, and the voltage drops appreciably when an electrical load is placed across the terminals of the cell. At the same time, a voltage of approximately 1.6 volts must be supplied to cause the cell to electrolyze water.

It is an object of my invention to provide a fuel cell capable of generating a higher electrical potential.

It is another object to provide a cell capable of forming hydrogen and oxygen by electrolysis at substantially lower voltages than now required.

It is a further object to provide a system for generating electrical energy which does not require the external supply of gaseous reactants.

These and other objects of my invention are accomplished by providing a cell comprising first and second spaced electrodes. A cation exchange membrane is interposed between and spaced from the first electrode and the second electrode. An alkaline electrolyte contacts the first electrode and the cation exchange membrane, and an acid electrolyte contacts the second electrode and the cation exchange membrane.

Figure 1:
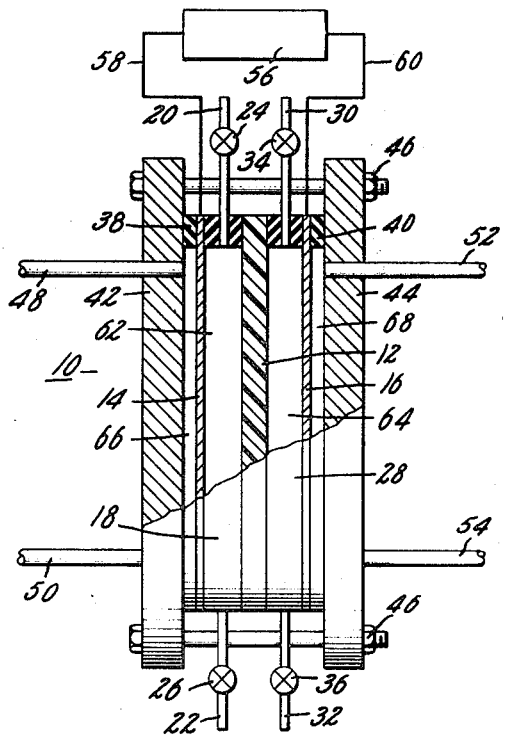
Figure 2:
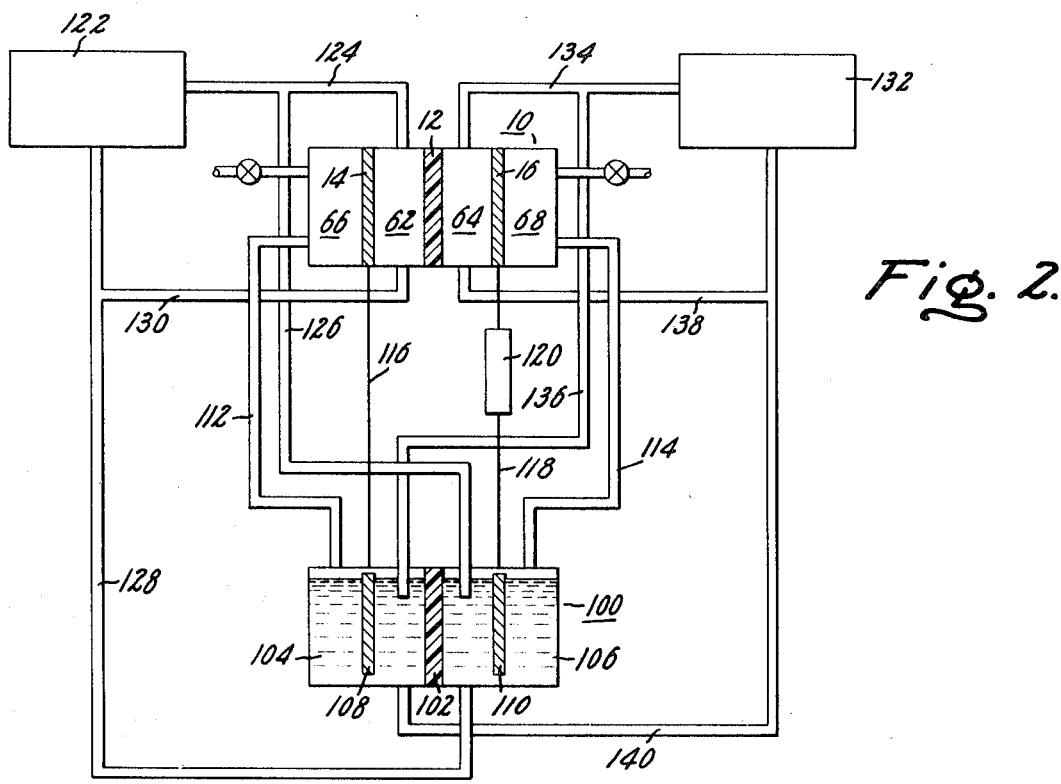

My invention may be better understood by reference to the following detailed description considered in conjunction with the drawings, in which FIG. 1 is an elevation, partly in section of a cell constructed according to my invention, and FIG. 2 is a schematic illustration of a system constructed according to my invention.

FIG. 1 illustrates a fuel cell 10 constructed according to my invention including a cation exchange membrane 12. A fuel electrode 14 and an oxidant electrode 16 are mounted in spaced relation with the cation exchange membrane. A first annular gasket 18 is provided to space the fuel electrode from the membrane. The first gasket includes inlet and outlet conduits 20 and 22 controlled by valve means 24 and 26, respectively. In like manner a second annular gasket 28 is used to space the oxidant electrode from the membrane and is provided with conduit means 30 and 32 controlled by valve means 34 and 36, respectively. Third and fourth annular gaskets 38 and 40 are provided to space first and second end plates 42 and 44 from the fuel and oxidant electrodes, respectively. A plurality of tie-bolt assemblies 46 are used to hold the cell in assembled relation. As shown, conduits 48 and 50 are provided in the first end plate 42 while conduits 52 and 54 are provided in the second end plate 44. An electrical load 56 is shown connected between the fuel and oxidant electrodes by electrical leads 58 and 60.

The first gasket, fuel electrode, and ion exchange membrane form a chamber 62 which is normally filled with an alkaline electrolyte. The second gasket, oxidant electrode, and ion exchange membrane form a chamber 64 which is normally filled with an acid electrolyte. The fuel electrode, first end plate, and third gasket define a chamber 66 to which fuel is supplied. The oxidant electrode, second end plate, and fourth gasket define a chamber 68 to which oxidant is supplied.

In operation of the fuel cell 10, the chamber 62 is filled with an alkaline electrolyte through inlet conduit 20, and the chamber 64 is filled with acid electrolyte through inlet conduit 30. A fuel is supplied to the fuel electrode 14 through conduit 48, and an oxidant is supplied to the oxidant electrode 16 through conduit 52. The fuel is oxidized at the fuel electrode while the oxidant is reduced at the oxidant electrode. The electrons given up in oxidation of the fuel are delivered from the fuel electrode to the electrical lead 58 while the electrons consumed by reduction are transported to the oxidant electrode by the electrical lead 60. Accordingly, an electrical current is passed through the electrical load 56.

Insofar as the operation of my fuel cell is described above it would appear identical to the operation of a conventional fuel cell. That this is not the case is readily illustrated by the fact that my inventive cell develops an electrical potential nearly double that of a conventional fuel cell. For example, a conventional fuel cell having a single electrolyte of unit activity utilizing hydrogen as a fuel and oxygen as an oxidant may be noted by application of the Nernst equation to be theoretically capable of producing a maximum electrical potential of only 1.23 volts. In actual practice the electrical potential developed by such cells is nearer a single volt. The equations for an alkaline electrolyte cell may be written:

(1) $\quad H_2 + 2OH^- \longrightarrow 2H_2O + 2e \quad$ (anode)
(2) $\quad \tfrac{1}{2}O_2 + H_2O + 2e \longrightarrow OH^- \quad$ (cathode)
(3) $\quad H_2 + \tfrac{1}{2}O_2 \longrightarrow H_2O \quad$ (over-all)

whereas the equations for a conventional acid electrolyte cell may be written:

(4) $\quad H_2 \longrightarrow 2H^+ + 2e \quad$ (anode)
(5) $\quad \tfrac{1}{2}O_2 + 2H^+ + 2e \longrightarrow H_2O \quad$ (cathode)
(6) $\quad \tfrac{1}{2}O_2 + H_2 \longrightarrow H_2O \quad$ (over-all)

By contrast, the half-cell and over-all reactions of my inventive cell may be written as follows:

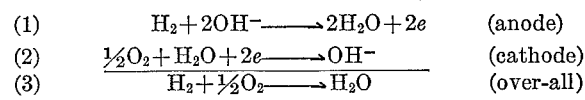
(7) $\quad H_2 + 2OH^- \longrightarrow 2H_2O + 2e \quad$ (anode)
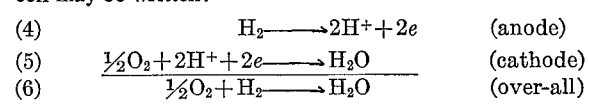
(8) $\quad \tfrac{1}{2}O_2 + 2H^+ + 2e \longrightarrow H_2O \quad$ (cathode)
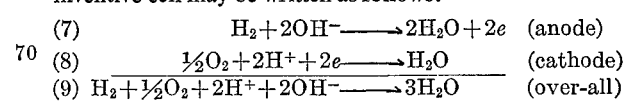
(9) $\quad H_2 + \tfrac{1}{2}O_2 + 2H^+ + 2OH^- \longrightarrow 3H_2O \quad$ (over-all)

Assuming unit activity of the acid and alkaline electrolytes, it can be determined by application of the Nernst equation that the potential developed at the fuel electrode, the anode, may be 0.828 volt while the potential developed at the oxidant electrode may be 1.229 volts. maximum theoretical voltage of the cell, being the algebraic difference of the potentials of the individual electrodes, may then be noted to be 2.057 volts. By increasing the activity of either the acid electrolyte, the alkaline electrolyte, or both, even higher potentials may be obtained. Activity, of course, is directly related to concentration.

By noting the over-all cell reaction expressed by Equation 9 above, it is apparent that both the acid and base employed as electrolytes are depleted in cell operation. While the cell may be operated for short periods without replenishing the acid or base, for extended periods of operation it is desirable to replenish the electrolytes. This may be accomplished with fuel cell 10 by continuously circulating the alkaline electrolyte through inlet and outlet conduits 20 and 22 and simultaneously circulating the acid electrolyte through inlet and outlet conduits 30 and 32. It is also noted that the water formed as a reaction product may be rejected at both the fuel electrode and oxidant electrode. Accordingly, it is desirable to supply fuel and oxidant at a rate in excess of the rate of consumption and to remove excess fuel and excess oxidant along with product water through conduits 50 and 54, respectively.

The elements forming cells constructed according to my invention are per se conventional. Any one of a variety of conventional fuel cell electrodes may be employed in the practice of my invention. A preferred electrode structure is disclosed by Niedrach et al. in commonly assigned application Ser. No. 232,689, filed Oct. 24, 1962. A dissimilar suitable electrode structure is disclosed by Williams et al., Pat. No. 3,116,170. It is appreciated that the structure of the fuel and oxidant electrodes may differ substantially. For example, while platinum metals and their alloys may be employed in both the fuel and oxidant electrodes, generally somewhat greater catalyst loadings will be required in the oxidant electrodes. Further, the electrode contacting the alkaline electrolyte may employ silver or nickel as a catalyst, whereas these catalysts would corrode when placed in contact with the acid electrolyte. Additionally, the oxidant electrode may include a spinel as a catalyst, this being a catalyst for oxygen only and unsuitable for use in a fuel electrode.

Any one of a variety of conventional cation exchange membranes may be employed in cells constructed according to my invention. Acceptable membranes are described in the commonly assigned patents to Grubb, Pat. No. 2,913,511, and Niedrach, Pat. No. 3,134,697. Other suitable ion exchange membranes are dislcosed by Bodamer, Pat. No. 2,827,426, and Hazenberg, Pat. No. 3,133,889. Preferred cation exchange membranes are disclosed by Hodgdon et al. in commonly assigned applications, Ser. Nos. 413,940; 414,011; and 444,010, Pat. No. 3,504,122, filed Nov. 25, 1964; and Mar. 30, 1965, respectively.

The acid and alkaline electrolytes employed in my inventive cells may be any conventional aqueous acid or alkaline electrolyte known to the art. Exemplary acid electrolytes include sulfuric acid, phosphoric acid, perchloric acid, formic acid, etc. Exemplary alkaline electrolytes include alkali and alkaline earth metal hydroxides. Of the alkaline electrolytes potassium hydroxide is perhaps the most commonly employed in the art and therefore the alkaline electrolyte preferred for use in my invention. It is preferred that the acid and alkaline electrolytes be chosen such that the metal salt formed by their reaction will be water soluble at the temperatures intended for fuel cell operation. This is not essential, however, and in some applications insolubility of the acid salt may even be desirable. The pH of the acid and alkaline electrolytes correspond to those conventionally employed in the art.

When the cell is used to generate electricity, any conventional fuel that can be electrochemically oxidized may be supplied to the fuel electrode. A wide variety of such fuels are known to the art including hydrocarbons, alcohols, hydrazine, carbon monoxide, etc. Hydrogen, being the fuel most easily and efficiently oxidized, is preferred. Similarly, any conventional oxidant may be supplied to the oxidant electrode. Oxygen and halogens are most commonly employed as oxidants. Air is commonly employed as an oxidant source. As is well understood in the art, when air is employed as an oxidant it is not necessary that it be positively transported into contact with the oxidant electrode, exposing a surface of the oxidant electrode to ambient air is generally all that is required for efficient operation.

It is appreciated that while the fuel cell 10 shown in FIG. 1 represents a preferred structural form, other structural forms may as well be employed. The fuel electrode may be immersed in the alkaline electrolyte and/or the oxidant electrode immersed in the acid electrolyte. Where the cell is to be used to generate electrical energy the electrodes are preferably cylindrical in form and provided with a closed end. The fuel or oxidant is then supplied to the interior of the electrode as is well understood in the art. Where the cell is to be used for electrolysis, the electrodes are preferably in the form of rods or plates immersed in the electrolyte. The upper portion of the cell above the alkaline electrolyte is provided with a duct for the escape of oxygen produced by electrolysis while the upper portion above the acid electrolyte is provided with a duct for the escape of hydrogen.

When a cell constructed according to my invention is employed for electrolysis, the following equations may be written:

(10) $\quad 4e^- + 4H^+ \longrightarrow 2H_2$ (cathode)
(11) $\quad 4OH^- \longrightarrow 2H_2O + O_2 + 4e^-$ (anode)
(12) $\quad 4OH^- + 4H^+ \longrightarrow 2H_2O + 2H_2 + O_2$ (over-all)

If it is assumed that the acid and alkaline electrolyte are both of unit activity, application of the Nernst equation indicates that electrolysis may be achieved merely by placing a potential of 0.401 volt across the electrodes of the cell. This is approximately one volt less than is required with a conventional fuel cell.

Whereas in the conventional fuel cell a higher electrical potential must be supplied to liberate hydrogen and oxygen by electrolysis than can be obtained by electrochemically combining these gases, in my inventive cells it requires approximately 1.5 volts less to achieve electrolysis than the voltage that can be obtained by electrochemically reacting hydrogen and oxygen. It is accordingly apparent that my inventive cells may be combined into a system which not only generates the hydrogen and oxygen to be electrochemically combined but also generates sufficient electricity to support electrolysis and to supply useful amounts of electrical energy to an external electrical load.

FIG. 2 schematically illustrates such a system. An electrolysis cell 100 is shown provided with a cation exchange membrane 102 dividing the cell into an acid electrolyte chamber 104 and an alkaline electrolyte chamber 106. A hydrogen evolution electrode 108 is immersed in the acid within the acid electrolyte chamber while an oxygen evolution electrode 110 is immersed in the alkaline electrolyte within the alkaline electrolyte chamber.

A fuel cell such as fuel cell 10, previously described, is provided to receive the hydrogen and oxygen evolved by the electrolysis cell. A hydrogen conduit 112 is provided extending between the acid electrolyte chamber of the electrolysis cell to the fuel chamber of the fuel cell. Similarly, an oxygen conduit 114 is shown extending from the alkaline electrolyte chamber to the oxidant chamber.

An electrical lead 116 is provided connecting the fuel electrode 14 and the hydrogen evolution electrode 108. An electrical lead 118 including an electrical load 120 is shown connecting the oxidant electrode 16 and the oxygen evolution electrode. To place the system in operation it is necessary to initially supply a small quantity of electricity to the electrolysis cell by means not shown or to initially provide fuel and oxidant in contact with the electrodes of the fuel cell. It is considered that the technique for placing the cell in operation is well within the ordinary skill of the art. Once operation is commenced, the fuel cell will generate electrical energy as indicated by Equations 7, 8, and 9 above. At the same time the electrolysis cell will function according to Equations 10, 11, and 12. Since less electrical energy is required to generate hydrogen and oxygen than is generated by the fuel cell, the excess electrical energy is available to electrical load 120.

As previously indicated with reference to the operation of the fuel cell, prolonged operation of cells constructed according to my invention will deplete the acid and alkaline electrolytes. To provide the system with prolonged operating characteristics an alkaline electrolyte conditioner 122 is schematically illustrated. During operation of the cells constructed according to my invention the positive ions associated with the alkaline electrolyte migrate from the alkaline electrolyte through the cation exchange membrane. At the same time the hydroxyl ions react to form water. The strength of the alkaline electrolyte is thereby depleted during the course of cell operation. Additionally, in the case of fuel cell use, the alkaline electrolyte may be sensitive to impurities in the fuel and further inactivated. For example, it is well understood in the art that potassium hydroxide is converted to potassium carbonate and bicarbonate when the fuel is a hydrocarbon or contains carbon monoxide or dioxide. Using conventional chemical techniques the alkaline conditioner restores the alkaline electrolyte to its desired concentration and purity. Conduit means 124 and 126 deliver the reconditioned alkaline electrolyte to the alkaline electrolyte chambers 62 and 106 of the fuel cell and electrolysis cell, respectively. Depleted alkaline electrolyte is taken from the cells to the conditioner by conduit means 128 and 130.

Just as the alkaline electrolyte is depleted during prolonged cell operation, so also is the acid electrolyte. For the purpose of extending the operating life of the system an acid electrolyte conditioner 132 is provided. When a cell constructed according to my invention is operated, the positive mobile ions present in the cation exchange membrane replace the hydrogen ions consumed at the cathode of the cell. If the ion exchange membrane is initially in the hydrogen ion form, the first ions entering the acid electrolyte from the ion exchange membrane will not alter the strength of the acid electrolyte. Since the ion exchange membrane is purposely maintained thin to reduce internal resistance, positive ions from the alkaline electrolyte will quickly replace the positive ions originally present in the membrane and will from there migrate into the acid electrolyte. The result is that an acid salt replaces the acid originally present in the electrolyte. The acid conditioner may be used to convert the acid salt back into the form of an acid. Alternately, the acid salt may be removed from the acid, rejected from the system, and replaced with make-up acid. Conduit means 134 and 136 are provided to deliver the reconditioned acid to the acid electrolyte chambers 64 and 104 of fuel and electrolysis cells, respectively. Depleted acid may be removed from the cells through conduit means 138 and 140.

The following working examples are set forth to illustrate my invention. These examples are not intended to limit the scope of the invention.

EXAMPLE 1

A fuel cell similar to that shown in FIG. 1 was constructed. An ion exchange membrane was employed having a thickness of 9 mils formed of 14 percent, by weight, polychlorotrifluoroethylene and the balance of a sulfonated copolymer of styrene and divinyl benzene. The membrane exhibited an ion exchange capacity of 0.7 and a resistance of 1.45 ohms when tested with alternating current of a 1000 cycles per second frequency in a Wheatstone bridge according to conventional resistance measuring techniques. Membranes of the type employed are described by Hodgdon et al. in application Ser. No. 414,011, previously noted.

Two electrodes were employed consisting of a mixture of platinum black and polytetrafluoroethylene supported on a tantalum screen. The catalyst mixture was 90 percent by weight platinum black and 10 percent by weight polytetrafluoroethylene. An external wet-proofing film of polytetrafluoroethylene was applied to each electrode. The electrodes were formed in accordance with the teachings of the Niedrach et al. application previously cited. Each electrode exhibited a geometric surface area, measured on one side, of 3.89 cm.$^2$ and a catalyst loading of 0.17 gram. The electrodes were each spaced 3 mm. from the ion exchange membrane.

A 3 normal solution of potassium hydroxide was employed as the alkaline electrolyte and a 0.5 normal solution of sulfuric acid was employed as the acid electrolyte. The cell, when operated at 25° C., exhibited current and voltage characteristics as set out in Table I.

TABLE I

| Current (milliamperes): | Potential (volts) |
|---|---|
| 0 | 1.914 |
| 1 | 1.828 |
| 4 | 1.759 |
| 10 | 1.706 |
| 20 | 1.643 |
| 50 | 1.494 |
| 100 | 1.270 |
| 150 | 1.070 |
| 200 | 0.877 |
| 240 | 0.738 |
| 280 | 0.602 |
| 300 | 0.564 |

EXAMPLE 2

To illustrate the effect of varying the concentration of the acid electrolyte on the performance of the cell, tests were also run on the cell described in Example 1 with acid concentrations of 1.5, 3, and 6 normal. The test results along with a comparative listing of the test results of Example 1 are set out in Table II.

TABLE II.—CELL PERFORMANCE AS A FUNCTION OF ELECTROLYTE CONCENTRATION

| Current (ma.) | Potential (volts) | | | |
|---|---|---|---|---|
| | $H_2SO_4$(0.5) KOH (3N) | $H_2SO_4$(1.5) KOH (3N) | $H_2SO_4$(3N) KOH (3N) | $H_2SO_4$(6N) KOH (3N) |
| 200 | 0.877 | 0.900 | 1.171 | 1.320 |
| 240 | 0.738 | 0.746 | 1.061 | 1.241 |
| 280 | 0.602 | 0.610 | 0.932 | 1.114 |
| 300 | 0.564 | 0.570 | 0.880 | 1.056 |

EXAMPLE 3

The procedure of Example 1 was repeated substituting a membrane of 3 mil thickness for the 9 mil membrane and substituting first methanol and then carbon monoxide as a fuel in place of hydrogen. The test results are shown in Table III.

TABLE III

| Current (ma.) | Potential (volts) | |
|---|---|---|
| | $CH_3OH$ | CO |
| 0 | 1.602 | 1.550 |
| 4 | 1.551 | 1.490 |
| 8 | 1.514 | 1.466 |
| 20 | 1.447 | 1.411 |
| 40 | 1.373 | 1.323 |
| 80 | 1.274 | 1.202 |
| 160 | 1.133 | 1.033 |
| 200 | 1.068 | 0.960 |
| 280 | 0.957 | 0.810 |
| 320 | 0.905 | 0.700 |
| 400 | 0.798 | 0.560 |

Although I have described certain preferred embodiments of my invention, it is appreciated that numerous modifications will be readily suggested to those skilled in the art. It is accordingly intended that the scope of my invention be determined with reference to the following claims.

What I claim as new and desire to secure by Letters Patent of the United States is:

1. A fuel cell comprising
    an anode and a cathode in spaced relation,
    a cation exchange membrane interposed between and spaced from said anode and said cathode,
    means confining an alkaline electroylte consisting of an alkaline liquid in contact with said anode and said cation exchange membrane,
    means confining an acid electrolyte in contact with said cathode and said cation exchange membrane, said acid electrolyte being electrode invariant and not involved in any reaction at the cathode electrode,
    said acid and alkaline electrolyte being involved in a neutralization reaction only, and
    means providing for the contact of fuel with said anode on the side away from said electrolyte, and
    means providing for the contact of an oxidant with said cathode on the side away from said electrolyte.

2. A cell according to claim 1 including electrolyte regenerating means providing for the circulation of said alkaline electrolyte and said acid electrolyte.

3. A system for generating electrical energy comprising an electrolysis cell comprised of
    a first anode and a first cathode in spaced relation,
    a first cation exchange membrane interposed between and spaced from said first anode and said first cathode,
    means for confining an acid electrolyte in contact with said first cathode and said first cation exchange membrane, and
    means for confining an alkaline electrolyte in contact with said first anode and said first cation exchange membrane,
    a fuel cell comprised of
        a second anode and a second cathode in spaced relation,
        a second cation exchange membrane interposed between and spaced from said second anode and said second cathode,
        means confining an alkaline electrolyte in contact with said second anode and said second cation exchange membrane, and
        means for confining an acid electrolyte in contact with said second cathode and said second cation exchange membrane,
    means for delivering oxygen from said first anode to said second cathode,
    means for delivering hydrogen from said first cathode to said second anode, and
    means for electrically connecting said first cathode to said second anode and said first anode to said second cathode including an electrical load, whereby said fuel cell may power said electrolysis cell to generate hydrogen and oxygen for consumption by said fuel cell and also supply electrical power to said load.

4. A system for generating electrical energy according to claim 3 additionally including means for circulating and conditioning said alkaline electrolyte of said electrolysis cell and said fuel cell.

5. A system for generating electrical energy according to claim 3 additionally including means for circulating and conditioning said acid electrolyte of said electrolysis cell and said fuel cell.

References Cited

UNITED STATES PATENTS

| | | | |
|---|---|---|---|
| 3,252,837 | 5/1966 | Satterfield et al. | 136—86 |
| 3,368,922 | 2/1968 | Salyer | 136—86 |
| 1,450,156 | 3/1923 | Smith | 204—129X |
| 3,202,546 | 8/1965 | Rightmire et al. | 136—86 |
| 3,261,716 | 12/1961 | Roblee, Jr. et al. | 136—86 |
| 3,269,932 | 8/1966 | Worsham et al. | 136—86 |
| 3,279,949 | 10/1966 | Schaefer et al. | 136—86 |
| 3,340,177 | 9/1967 | Rogers et al. | 136—86UX |

FOREIGN PATENTS

| | | | |
|---|---|---|---|
| 1,358,486 | 3/1964 | France | 136—86 |
| 1,051,820 | 3/1959 | Germany | 136—86 |

ALLEN B. CURTIS, Primary Examiner

U.S. Cl. X.R.

204—1, 129